US009311631B2

(12) United States Patent
Johnson

(10) Patent No.: US 9,311,631 B2
(45) Date of Patent: Apr. 12, 2016

(54) SYSTEM AND METHOD FOR SMART DEPOSIT RETRIEVAL

(71) Applicant: Bank of America Corporation, Charlotte, NC (US)

(72) Inventor: Tyler R. Johnson, Tega Cay, SC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/558,938

(22) Filed: Dec. 3, 2014

(65) Prior Publication Data

US 2015/0108212 A1    Apr. 23, 2015

Related U.S. Application Data

(63) Continuation of application No. 13/801,153, filed on Mar. 13, 2013, now Pat. No. 9,038,889.

(51) Int. Cl.
*G06Q 40/00* (2012.01)
*G06Q 20/10* (2012.01)
*G07F 19/00* (2006.01)

(52) U.S. Cl.
CPC .......... *G06Q 20/108* (2013.01); *G06Q 20/1085* (2013.01); *G07F 19/202* (2013.01)

(58) Field of Classification Search
CPC ... G06Q 40/02; G06Q 20/0425; G06Q 20/10; G06Q 10/06; G06Q 10/087; G06Q 20/04; G06Q 20/102; G06Q 20/18; G06Q 40/00; G06Q 40/12; G06Q 10/08; G06Q 20/042; G06Q 20/40; G06Q 30/04; G06Q 20/0453
USPC .......................................... 235/379, 380, 382
See application file for complete search history.

(56) References Cited

U.S. PATENT DOCUMENTS

| 4,245,902 | A | 1/1981 | Cataldo et al. |
|---|---|---|---|
| 4,754,126 | A | 6/1988 | Caldwell |
| 5,284,101 | A | 2/1994 | Oder et al. |
| 5,583,759 | A | 12/1996 | Geer |
| 6,328,208 | B1 | 12/2001 | Artino et al. |
| 6,328,258 | B1 | 12/2001 | Porte |
| 6,601,045 | B1 | 7/2003 | Depietro et al. |
| 7,185,804 | B1 | 3/2007 | Rozlosnik et al. |

(Continued)

OTHER PUBLICATIONS https://www.fnbweb.biz/business-accounts.asp, First National Bank, 1 pg, 2013.

(Continued)

*Primary Examiner* — Thien M Le
(74) *Attorney, Agent, or Firm* — Michael A. Springs

(57) ABSTRACT

According to one embodiment, a system includes a processor and an interface. The interface receives, from a terminal, planned-deposit information. The terminal is at a location that is remote from a deposit location. The processor associates a deposit identifier with the planned-deposit information and stores the planned-deposit information and the deposit identifier in a memory.

According to one embodiment, a method includes recognizing, at a deposit location, a deposit identifier. The method includes identifying, based on the deposit identifier and information stored in a memory, a planned deposit. The method includes detecting that the planned deposit has been delivered to a depository and determining, by a processor and based on one or more business rules, an availability of funds associated with the planned deposit.

17 Claims, 3 Drawing Sheets

(56) References Cited

U.S. PATENT DOCUMENTS

| | | | |
|---|---|---|---|
| 7,520,421 B2 | 4/2009 | Salafia et al. | |
| 7,965,184 B1 * | 6/2011 | Nichols et al. | 340/568.7 |
| 7,966,258 B2 | 6/2011 | Geer | |
| 8,094,021 B2 * | 1/2012 | Nichols et al. | 340/568.7 |
| 8,626,661 B2 | 1/2014 | Gilder | |
| 8,688,579 B1 * | 4/2014 | Ethington et al. | 705/42 |
| 8,837,806 B1 | 9/2014 | Ethington et al. | |
| 9,004,352 B1 * | 4/2015 | Graef et al. | 235/379 |
| 2005/0108164 A1 * | 5/2005 | Salafia et al. | 705/42 |
| 2007/0078560 A1 * | 4/2007 | Jones et al. | 700/224 |
| 2009/0006249 A1 * | 1/2009 | Morgan et al. | 705/39 |
| 2010/0016466 A1 * | 1/2010 | Lueck | 523/116 |
| 2011/0106681 A1 | 5/2011 | Cockerell et al. | |
| 2013/0178139 A1 * | 7/2013 | Hallowell et al. | 453/15 |
| 2014/0166745 A1 * | 6/2014 | Graef et al. | 235/379 |

OTHER PUBLICATIONS https://www.fmbbank.com/Content/Default/124/113/electronic-banking/webdeposit.html, Farmers and Merchants Bank, Electronic Business tool—WebDeposit, 1 pg, Mar. 26, 2013.

* cited by examiner

SYSTEM AND METHOD FOR SMART DEPOSIT RETRIEVAL

RELATED APPLICATION

This application is a continuation of U.S. application Ser. No. 13/801,153, filed Mar. 13, 2013, and entitled "Smart Deposit."

TECHNICAL FIELD

The present disclosure relates generally to deposits, and more specifically to smart deposits.

BACKGROUND

An entity may receive a deposit from a customer at a branch location. After receipt, the entity may perform immediate verification, post verification, or package forwarding at the branch location before delivering the deposit to a central depository. These intermediate steps may be expensive and/or time consuming and may pose security risks.

SUMMARY

According to certain embodiments of the present disclosure, disadvantages and problems associated with previous systems for customer deposits to an entity may be reduced or eliminated.

According to one embodiment, a system includes a processor and an interface. The interface receives, from a terminal, planned-deposit information. The terminal is at a location that is remote from a deposit location. The processor associates a deposit identifier with the planned-deposit information and stores the planned-deposit information and the deposit identifier in a memory.

According to one embodiment, a method includes recognizing, at a deposit location, a deposit identifier. The method includes identifying, based on the deposit identifier and information stored in a memory, a planned deposit. The method includes detecting that the planned deposit has been delivered to a depository and determining, by a processor and based on one or more business rules, an availability of funds associated with the planned deposit.

Certain embodiments of the disclosure may provide one or more technical advantages. For example, identifying, based on the deposit identifier and information stored in a memory, a planned deposit may allow for identification of planned-deposit information without immediate verification, post verification, or package forwarding. This may limit needed processing and storage resources for performing these steps and for performing investigations that are needed when deposits go missing during these processes.

Certain embodiments of the disclosure may provide one or more economic advantages. In an embodiment, receiving planned-deposit information from a terminal that is remote from a deposit location may allow a manager associated with a customer, for example, to input information about a planned deposit and have verification that the information was received before sending another employee to make the planned deposit. This makes the process more convenient, efficient, and secure. Associating a deposit identifier with the planned deposit and storing the information associated with the planned deposit and the deposit identifier in memory may allow the system to recognize a planned deposit when deposited by the employee without the employee needing any other information about the deposit, which also improves convenience, efficiency, and security. Identifying, based on the deposit identifier and information stored in a memory, a planned deposit, detecting that the planned deposit has been delivered to a depository, and determining, by a processor and based on one or more business rules, an availability of funds associated with the planned deposit may allow for identification of planned deposit information without immediate verification, post verification, or package forwarding. This may reduce expenses associated with performing these steps, including labor costs for performing these steps, as well as investigation and/or theft costs associated with deposits that go missing during these processes.

Certain embodiments of the present disclosure may include some, all, or none of the above advantages. One or more other economic, technical, or other advantages may be readily apparent to those skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
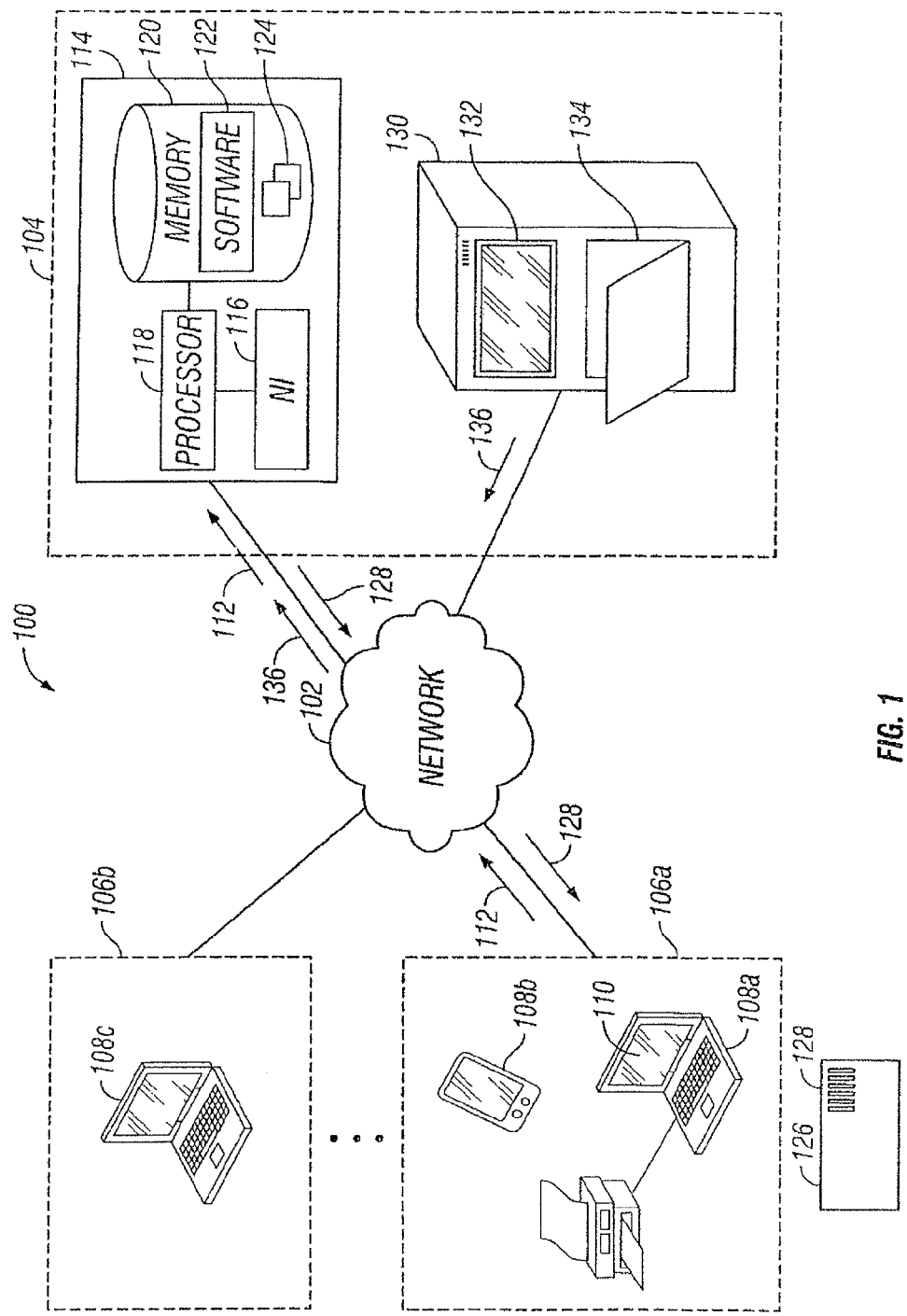
FIG. 1 illustrates an example system for facilitating smart deposits.
Figure 2:
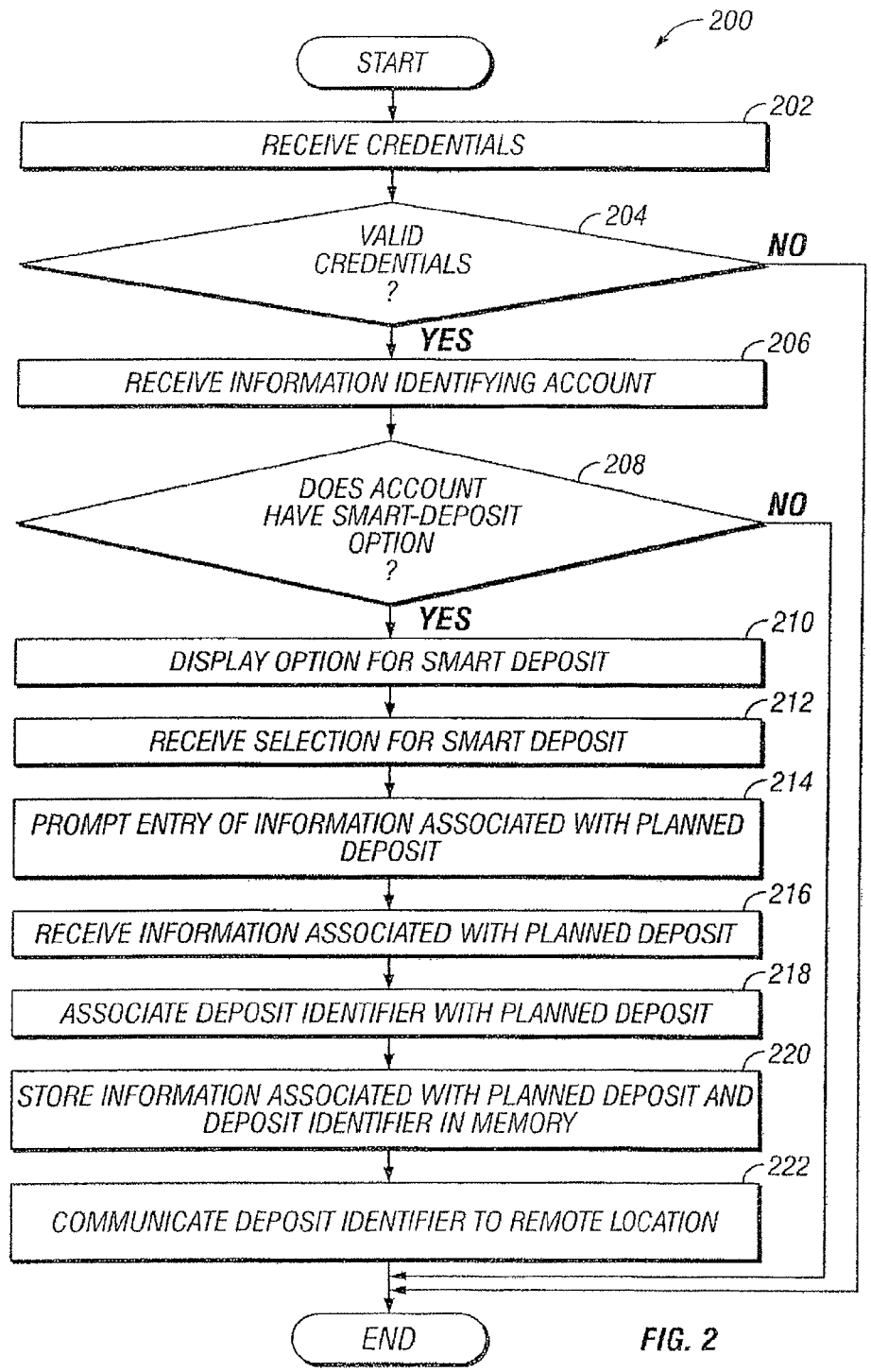
FIG. 2 illustrates an example method for facilitating initiation of a smart deposit at a site that is remote from a deposit location and verifying planned-deposit information to a user at the remote site.
Figure 3:
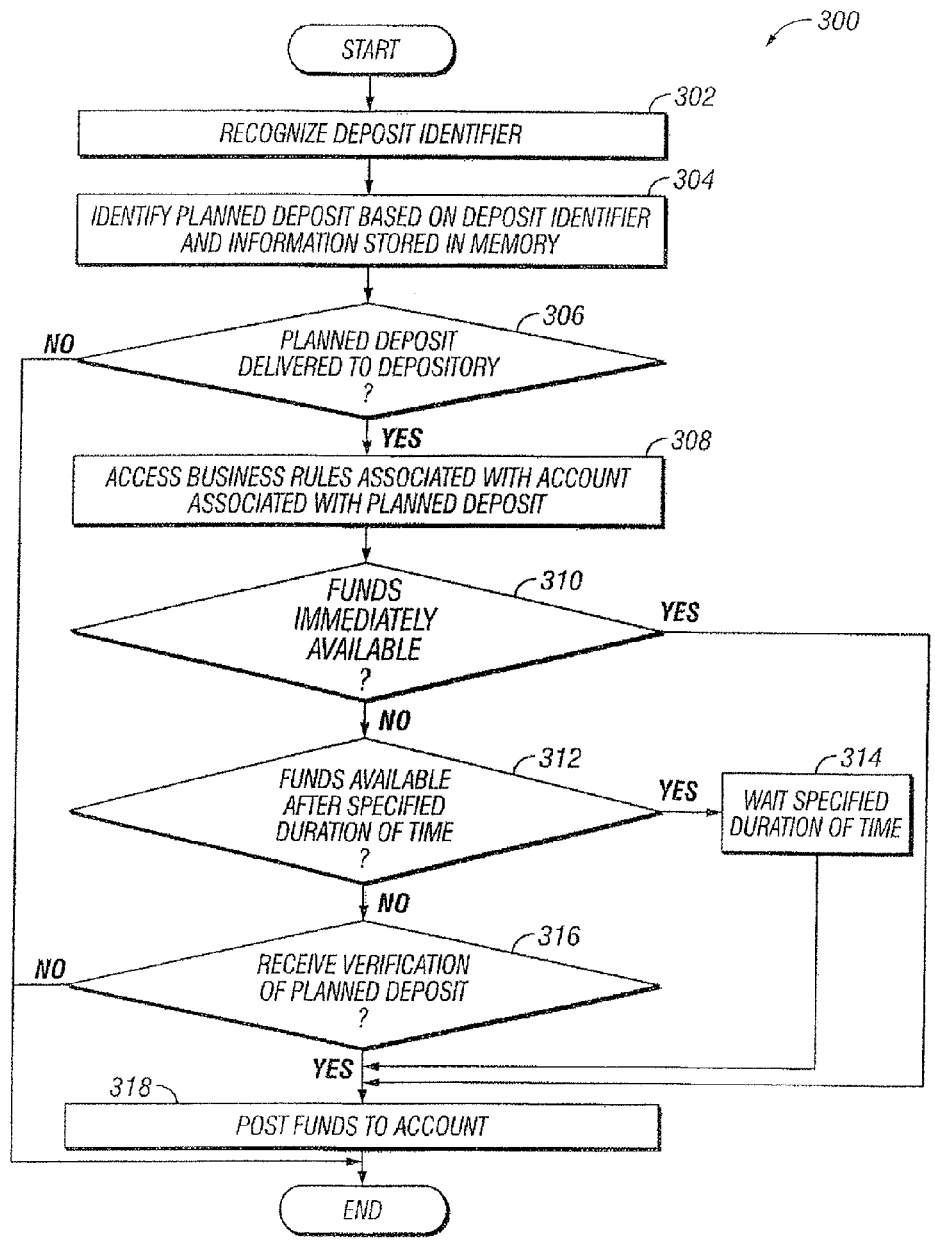
FIG. 3 illustrates an example method for facilitating a smart deposit for a planned deposit at deposit location.

Embodiments of the present disclosure are best understood by referring to FIGS. 1 through 3 of the drawings, like numerals being used for like and corresponding parts of the various drawings.

FIG. 1 illustrates an example system 100 for facilitating smart deposits, according to one embodiment of the present disclosure. System 100 coordinates interactions between terminals 108, deposit location 130, and smart-deposit module 114. Via the coordination, smart-deposit module 114 facilitates smart deposits on behalf of entity 104.

In the illustrated embodiment, system 100 includes a plurality of customers 106 that interact with terminals 108 to create and send planned-deposit information 112. Smart-deposit module 114, which may be associated with entity 104, receives planned-deposit information 112, generates deposit identifier 128, associates deposit identifier 128 with the planned deposit, communicates deposit identifier 128 to terminal 108a, and stores planned-deposit information 112 and deposit identifier 128 in memory 120. Deposit identifier 128 may be a barcode, for example, and may be printed or otherwise ascertained at terminal 108a and placed on deposit bag 126. Representatives of customers 106 may take deposit bag 126 to deposit location 130 and place deposit identifier 128 near deposit-identifier scanner 132 so that deposit-identifier scanner 132 recognizes deposit identifier 128. Deposit location 130, which may be associated with entity 104, may communicate deposit-location information 136, indicating recognition of deposit identifier 128, to smart-deposit module 114, which may identify, based on deposit identifier 128 and planned-deposit information 112, the planned deposit. An opening of depository 134 may be released, a representative of customer 106a may drop deposit bag 126 in depository 134, and depository 134 may detect that a deposit has been delivered to depository 134. Deposit location 130 may communicate deposit-location information 136 to smart-deposit module 114 to indicate that the planned deposit has been delivered. Smart-deposit module 114 may determine, based on one or more business rules 124, an availability of funds associated with the planned deposit.

Network 102 represents any suitable network that facilitates communication between the components of system 100. Network 102 may include any interconnecting system capable of transmitting audio, video, signals, data, messages, or any combination of the preceding. Network 102 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, any other suitable communication link, including combinations thereof operable to facilitate communication between the components of system 100.

Entity 104 represents any suitable type of entity in any suitable industry that facilitates transactions for its customers 106. For example, entity 104 may be a bank, brokerage house, investment firm, or any other suitable entity. In an embodiment, entity 104 facilitates smart deposits.

Customers 106 represent any suitable person or persons and/or any suitable type of entity in any suitable industry that interacts with entities 104 to complete a deposit. The deposit may be a deposit of funds to an account associated with customer 106a and serviced by entity 104. Customer 106a may be a person, a group of people, an organization, a business, or any other suitable entity.

Terminals 108 represent any suitable type of interface for creating planned-deposit information 112. Terminals 108 may be operated by customers 106, or in any other suitable manner. Terminals 108 include any suitable hardware, software, or logic (including a processor) to carry out its operations. Terminals 108 represent any components that may display information and receive information for creating and sending planned-deposit information 112. Terminals 108 may include a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 100 in order to display information received from other components of system 100 and input information to be communicated to other components of system 100. Terminals 108 may further allow a user to request information from other components of system 100 and/or provide information to other components of system 100. Terminal 108 may comprise a user interface, such as a display, a microphone, keypad, or other appropriate terminal equipment usable by a user.

In the illustrated embodiment, terminal 108a includes a graphical user interface ("GUI") 110 that displays information received from various components in system 100 to a user of terminal 108a and receives input from a user of terminal 108a. For example, GUI 110 displays information received from smart-deposit module 114. As another example, GUI 110 receives information from the user of terminal 108a for use in the smart-deposit process. GUI 110 is generally operable to tailor and filter data entered by and presented to the user. GUI 110 may provide the user with an efficient and user-friendly presentation of information. GUI 110 may comprise a plurality of displays having interactive fields, pull-down lists, and buttons operated by the user. GUI 110 may include multiple levels of abstraction including groupings and boundaries. It should be understood that the term GUI 110 may be used in the singular or in the plural to describe one or more GUIs 110 and each of the displays of a particular GUI 110.

Planned-deposit information 112 includes information related to a request to perform a deposit. Planned-deposit information 112 may be associated with a particular customer 106a and/or a particular entity 104. Information included in planned-deposit information 112 may include general information associated with customer 106a and/or entity 104, information associated with an account associated with customer 106a and entity 104, information associated with the amount of a planned deposit, information associated with the form of the funds to be deposited (e.g., cash, one or more checks, a combination of cash and one or more checks, or any other suitable form), information associated with the amount of one or more particular forms, and/or any other suitable information. In certain embodiments, planned-deposit information 112 includes an amount of cash to be included in a planned deposit. In certain embodiments, planned-deposit information 112 includes an amount of money for each of one or more checks to be included in a planned deposit and/or a total amount of money to be deposited in the form of one or more checks. In certain embodiments, planned-deposit information 112 includes a total amount of money to be deposited in a planned deposit. In certain embodiments, planned-deposit information 112 includes information associated with customer 106 and an account to which the planned deposit should be credited. In certain embodiments, planned-deposit information 112 may be based on selections or other types of information input at terminals 108 or a particular terminal 108a. In certain embodiments, the selections provided may be chosen from a finite set of possible choices, freeform responses, a non-response (e.g., a blank response or an indication that the answer is unknown), or any other suitable response. Terminal 108a communicates planned-deposit information 112 over network 102 to smart-deposit module 114 or any other suitable location.

Smart-deposit module 114 represents a component that facilitates the interactions between customers 106 and entity 104 to complete a smart deposit. Smart-deposit module 114 may include a network server, any suitable remote server, a mainframe, a host computer, a workstation, a web server, a personal computer, a file, server, or any other suitable device operable to carry out the described operations. In some embodiments, smart-deposit module 114 may execute any suitable operating system such as IBM's zSeries/Operating system (z/OS), MS-DOS, PC-DOS, MAC-OS, WINDOWS, UNIX, OPenVMS, Linux, or any other appropriate operating systems, including operating systems developed in the future. The functions of smart-deposit module 114 may be performed by any suitable combination of one or more servers or other components at one or more locations. In the embodiment where the modules are servers, the servers may be public or private servers, and each server may be a virtual or physical server. The server may include one or more servers at the same or at locations remote from one another. Also, smart-deposit module 114 may include any suitable component that functions as a server.

In certain embodiments, smart-deposit module 114 includes network interface 116, processor 118, and memory 120.

Network interface 116 represents any suitable device operable to receive information from network 102, perform suitable processing of the information, communicate to other devices, or any combination of the preceding. For example, network interface 116 may receive planned-deposit information 112 for a particular customer 106a and entity 104 from terminal 108a. Network interface 116 represents any port or connection, real or virtual, including any suitable hardware and/or software, including protocol conversion and data processing capabilities, to communicate through a LAN, WAN, or other communication systems that allow smart-deposit module 114 to exchange information with the components of system 100.

Processor 118 communicatively couples to network interface 116 and memory 120. Processor 118 controls the operation and administration of smart-deposit module 114 by processing information received from network interface 116 and memory 120. Processor 118 includes any hardware and/or software that operates to control and process information. For example, processor 118 may generate deposit identifier 128 in response to receiving planned-deposit information 112, associate deposit identifier 128 with a planned deposit, store planned-deposit information 112 and deposit identifier 128 in memory 120, associate the planned deposit with a particular account, and initiate printing of a barcode that is deposit identifier 128 at terminal 108a. As other examples, processor 118 may identify, in response to network interface 116 receiving information indicating that deposit identifier 128 has been recognized at deposit location 130 by deposit-identifier scanner 132 and based on deposit identifier 128 and information stored in memory 120, a planned deposit and determine, in response to network interface 116 receiving information indicating that depository 134 has detected that the planned deposit has been delivered to depository 134 and based on one or more business rules 124, an availability of funds associated with the planned deposit. Processor 118 may be a programmable logic device, a microcontroller, a microprocessor, any suitable processing device, or any suitable combination of the preceding.

Memory 120 stores, either permanently or temporarily, data, operational software, or other information for processor 118. Memory 120 includes any one or a combination of volatile or nonvolatile local or remote devices suitable for storing information. For example, memory 120 may include random access memory (RAM), read only memory (ROM), magnetic storage devices, optical storage devices, database and/or network storage, removable storage media, or any other suitable information storage device or a combination of these devices. While illustrated as including particular modules, memory 120 may include any suitable information for use in the operation of smart-deposit module 114.

In certain embodiments, memory 120 includes management software 122 and business rules 124. Management software 122 represents any suitable set of instructions, logic, or code embodied in a non-transitory, computer readable medium and operable to facilitate the operation of smart-deposit module 114. Business rules 124 includes rules associated with accounts that smart-deposit module 114 may use to determine whether an account has an option for smart deposit and to determine availability of funds deposited in any particular account.

Business rules 124 includes information used by processor 118 to determine whether an account has an option for smart deposit and to determine an availability of funds associated with a planned deposit. One or more of business rules 124 may be associated with an account. The one or more of business rules 124 may indicate that the account does or does not have a smart-deposit option and may indicate that funds associated with a planned deposit should be posted to the associated account for availability at one of the following times: immediately, after a specified duration of time, and after a verification of the planned deposit.

Deposit bag 126 may be a bag or any suitable container for storing and transporting a planned deposit. Deposit bag 126 may be designed for efficient organization of various forms of funds to be deposited. For example, deposit bag 126 may be designed with separate pockets for cash and checks. Deposit bag 126 may be designed to limit or eliminate tampering. For example, deposit bag 126 may be designed to be opened only by individuals or entities with authorization. For example, a manager associated with customer 106a and particular representatives of entity 104 may have access to open deposit bag 126 by key, code, or any other suitable way, while others, such as an employee of customer 106a who is responsible for taking deposit bag 126 to deposit location 130 or certain representatives of entity 104, may not have access to open deposit bag 126. This may allow for improved security and efficiency. For example, a manager of customer 106a may entrust another employee of customer 106a to deliver deposit bag 126 to deposit location 130 knowing that the employee will not be able to open deposit bag 126.

Deposit identifier 128 represents an identifier used to identify a planned deposit. Deposit identifier 128 may be a barcode, for example. As additional examples, deposit identifier 128 may be a QR code, a 3d identifier operable to be identified by a 3D scanner, or any other suitable form of identifier. In response to receiving planned-deposit information 112, smart-deposit module 114 may generate deposit identifier 128, associate deposit identifier 128 with the planned deposit, store deposit identifier 128 in memory 120, and communicate deposit identifier 128 to terminal 108a. Smart-deposit module 114 may also prompt printing or otherwise ascertaining deposit identifier 128 at terminal 108a. Customer 106a may print deposit identifier 128 at terminal 108a and may affix deposit identifier 128 to deposit bag 126 so that the planned deposit may be recognized when taken to deposit location 130 based on deposit identifier 128. This may allow for improved security and efficiency. For example, a manager of customer 106a may entrust another employee of customer 106a to deliver deposit bag 126 to deposit location 130 without the employee needing or being able to know any of planned-deposit information 112.

Deposit location 130 may be a location or apparatus associated with entity 104 where a planned deposit may be delivered. Deposit location 130 may include deposit-identifier scanner 132 and depository 134. A representative of customer 106a may take deposit bag 126 to deposit location 130. Deposit-identifier scanner 132 may be a device for detecting deposit identifier 128. The representative of customer 106a may place deposit identifier 128 near deposit-identifier scanner 132 and deposit-identifier scanner 132 may detect deposit identifier 128. Deposit location 130 may send information to smart-deposit module 114 indicating that deposit identifier 128 has been detected at deposit location 130. In response to detecting deposit identifier 128, depository 134 may release an opening to allow deposit bag 126 to be placed in depository 134. The representative of customer 106a may place deposit bag 126 in depository 134. Depository 134 may detect that deposit bag 126 has been placed in depository 134 and may send information to smart-deposit module 114 indicating that deposit bag 126 has been placed in depository 134.

Deposit-location information 136 may be information indicating events at deposit location 130. Deposit location 130 may send deposit-location information 136 to smart-deposit module 114 in response to detecting events at deposit location 130. For example, deposit-location information 136 may include information indicating that deposit identifier 128 has been detected at deposit location 130, for example, by deposit-identifier scanner 132 detecting deposit identifier 128, and may be sent to smart-deposit module 114 in response to detecting deposit identifier 128 and smart-deposit module 114 may use this to identify a particular planned deposit. As another example, deposit-location information 136 may include information indicating that deposit bag 126 has been placed in depository 134 and deposit location 130 may send deposit-location information 136 in response to depository 134 detecting that deposit bag 126 has been placed in depository 134 and smart-deposit module 114 may use deposit-location information 136 and business rules 124 to determine when funds associated with the planned deposit should be posted to the associated account for availability to customer 106*a*. Alternatively or in addition, smart-deposit module 114 may use deposit-location information 136 to update a manifest indicating deposits made to deposit location 130.

In an example embodiment of operation, a user of terminal 108*a*, such as a manager associated with customer 106*a*, inputs information at terminal 108*a* to initiate a smart deposit. Based on the input information, planned-deposit information 112 is communicated by network 102 to smart-deposit module 114. Planned-deposit information 112 includes an amount of cash to be included in planned deposit and an amount of money to be included in the planned deposit in the form of one or more checks. Smart-deposit module 114 may receive planned-deposit information 112 using network interface 116. Smart-deposit module 114 generates deposit identifier 128 and associates deposit identifier 128 with planned-deposit information 112 and stores both in memory 120. Smart-deposit module 114 may prompt printing of deposit identifier 128 at terminal 108*a*. The manager associated with customer 106*a* puts the cash and check described in planned-deposit information 112 in deposit bag 126, affixes deposit identifier 128 to deposit bag 126, and may give deposit bag 126 to another employee associated with customer 106*a* for delivery to deposit location 130. The employee transports deposit bag 126 to deposit location 130 and places deposit identifier 128 near deposit-identifier scanner 132. Deposit-identifier scanner 132 detects deposit identifier 128 and communicates deposit-location information 136 to smart-deposit module 114 to indicate that deposit identifier 128 has been detected. Smart-deposit module 114 may identify a planned deposit based on deposit identifier 128 and information stored in memory 120 associating deposit identifier 128 with the planned deposit. In response to identifying the planned deposit, smart-deposit module 114 may prompt release of an opening of depository 134. The employee may place deposit bag 126 in depository 134. Depository 134 may detect that deposit bag 126 has been placed in depository 134 and may communicate deposit-location information 136 to smart-deposit module 114 indicating that the planned deposit, in the form of deposit bag 126, has been placed in depository 134. Smart-deposit module 114, based on business rules 124 and the account associated with the planned deposit, determines that the funds in the planned deposit should immediately be posted to the account to be available for access by customer 106*a* and posts the funds to the account.

In an additional example embodiment of operation, smart-deposit module 114, based on business rules 124 and the account associated with the planned deposit, determines that the funds in the planned deposit should be posted to the account to be available for access by customer 106*a* after a specified period of time, waits the specified period of time, and posts the funds to the account.

In an additional example embodiment of operation, smart-deposit module 114, based on business rules 124 and the account associated with the planned deposit, determines that the funds in the planned deposit should be posted to the account after verification of planned deposit, receives verification of the planned deposit, and posts the funds to the account.

In an additional example embodiment of operation, deposit identifier 128 is in the form of an alphanumeric string of characters and, instead of having deposit identifier 128 scanned at deposit location 130, the employee enters deposit identifier 128 in a GUI at deposit location 130 in order for deposit location 130 to detect deposit identifier 128.

In an additional example embodiment of operation, smart-deposit module 114 creates a manifest of one or more deposits delivered to deposit location 130. For example, based on identifying a particular deposit identifier 128 scanned or otherwise recognized at deposit location 130 and receiving deposit-location information 136 indicating that the planned deposit has been placed in depository 134, smart-deposit module 114 may create an entry in a manifest listing information about the deposit to indicate that the deposit has been made and is in depository 134. Smart-deposit module 114 may update the manifest with additional entries as additional deposit identifiers 128 are recognized and associated deposits are placed in depository 134. The manifest may include additional information about the deposit, including, for example, the time and date that the deposit was placed in depository 134. A transit operator may pick up deposits from depository 134. The transit operator may access the manifest in order to verify that the deposits picked up from depository 134 are the same as the entries in the manifest. For example, manifest may be displayed on an interface at deposit location 130, printed at deposit location 130 or at another remote location, sent by e-mail to a device accessible by transit operator, or otherwise communicated in any suitable manner to allow transit operator to access the manifest. In particular embodiments, the version of the manifest communicated to a transit operator may be limited to include only entries for deposits made since the last pickup from depository 134.

A component of system 100 may include an interface, logic, memory, and/or any other suitable element. An interface receives input, sends output, processes the input and/or output, and/or performs other suitable operations. An interface may comprise hardware and/or software. Logic performs the operations of the component, for example, and executes instructions to generate output from input. Logic may include hardware, software, and/or other logic. Logic may be encoded in one or more nontransitory medium, such as a computer readable medium or any other tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 100 without departing from the scope of the disclosure. The components of the systems and apparatuses may be integrated or separated. For example, smart-deposit module 114 may be integrated directly into terminal 108*a*. As another example, deposit identifier 128 may take the form of an alphanumeric string of characters or any suitable form that allows for identification of a planned deposit. Instead of deposit-identifier scanner 132, deposit location 130 may include a GUI or any other suitable apparatus for allowing detection of deposit identifier 128. For example, a user may enter deposit identifier 128 in a GUI at deposit location 130. Moreover, the operations of the systems and apparatuses may be performed by more, fewer, or other components. Additionally, operations of the systems and apparatuses may be performed using any suitable logic comprising software, hardware, and/or other logic.

FIG. 2 illustrates an example method 200 for facilitating initiation of a smart deposit at a site that is remote from deposit location 130 and verifying planned-deposit information 112 to a user at the remote site, according to one embodiment of the present disclosure.

Smart-deposit module 114 may receive credentials at step 202. For example, a user of terminal 108a, such as a manager associated with customer 106a, may access a website associated with entity 104 and enter credentials such as a username and password. Terminal 108a may communicate credentials to smart-deposit module 114 using network 102. Smart-deposit module 114 may access the entered credentials using network interface 116. The method may continue at step 204.

Smart-deposit module 114 may determine whether the received credentials are valid at step 204. Valid credentials may be a username and password associated with customer 106a or a particular representative of customer 106a of entity 104 and one or more accounts associated with customer 106a. If the received credentials are not valid, the method may end. If the received credentials are valid, the method may continue at step 206.

Smart-deposit module 114 may receive information identifying an account at step 206. For example, a user of terminal 108a may identify one out of one or more accounts associated with the credentials. For example, the user may select, on GUI 110, an icon associated with a particular account. The method may continue at step 208.

Smart-deposit module 114 may determine whether the identified account has a smart-deposit option at step 208. Business rules 124 may indicate whether a particular account is associated with an option to make smart deposits. If the account does not have a smart-deposit option, the method may end. If the account does have a smart-deposit option, the method may continue to step 210.

Smart-deposit module 114 may prompt display of an option for smart deposit on GUI 110 at step 210. For example, smart-deposit module 114 may prompt display of an icon for smart deposit on GUI 110. The method may continue to step 212.

Smart-deposit module 114 may receive a selection to make a smart deposit at step 212. For example, a user of terminal 108a may select the icon for smart deposit on GUI 110 and the selection may be communicated to smart-deposit module 114. The method may continue to step 214.

Smart-deposit module 114 may prompt entry of planned-deposit information 112 at step 214. For example, smart-deposit module 114 may prompt a display of fields for entry of an amount of cash and an amount of money in the form of checks to be included in a planned deposit. The method may continue at step 216.

Smart-deposit module 114 may receive planned-deposit information 112 at step 216. For example, a user of terminal 108a may enter an amount of cash to be deposited and an amount of funds to be deposited in the form of check and the amounts may be communicated to smart-deposit module 114 using network 102. The method may continue to step 218.

Smart-deposit module may associate deposit identifier 128 with planned-deposit information 112 at step 218. Associating the deposit identifier 128 with the planned deposit may allow for identification of a planned deposit at a later time based on deposit identifier 128. The method may continue at step 220.

Smart-deposit module 114 may store planned-deposit information 112 and deposit identifier 128 in memory 120 at step 220. This may allow for access to this information at a later time to, for example, identify planned-deposit information 112 based on deposit identifier 128. The method may continue at step 222.

Smart-deposit module 114 may communicate deposit identifier 128 to a remote location at step 222. For example, smart-deposit module 114 may communicate deposit identifier 128 to terminal 108a for display of deposit identifier 128 on GUI 110 and/or printing of deposit identifier 128 at terminal 108a. The method may end.

Modifications, additions, or omissions may be made to method 200 disclosed herein without departing from the scope of the disclosure. The methods may include more, fewer, or other steps. For example, the method may exclude step 206 if, for example, only one account is associated with the input credentials so that the credentials alone identify the account to be accessed. As an additional example, smart-deposit module 114 may prompt printing of deposit identifier 128 at terminal 108a. As an additional example, smart-deposit module 114 may generate deposit identifier 128. As an additional example, a representative of customer 106a may affix deposit identifier 128 to deposit bag 126. Additionally, steps may be performed in parallel or in any suitable order. For example, smart-deposit module 114 may communicate deposit identifier 128 to the remote location before storing planned-deposit information 112 and deposit identifier 128 in memory 120.

FIG. 3 illustrates an example method 300 for facilitating a smart deposit for a planned deposit at deposit location 130, according to one embodiment of the present disclosure.

Deposit location 130 may recognize deposit identifier 128 at step 302. For example, an employee associated with customer 106a may bring deposit bag 126 to deposit location 130. Deposit bag 126 may be affixed with deposit identifier 128 and the employee may place deposit identifier 128 near deposit-identifier scanner 132 and deposit-identifier scanner 132 may recognize deposit identifier 128. Alternatively, deposit identifier 128 may be in the form of an alphanumeric string of characters or any other suitable format. Deposit location 130 may include a GUI and may recognize deposit identifier 128 by receiving input, identifying deposit identifier 128, from the employee or another user of the GUI. Deposit location 130 may additionally communicate deposit identifier 128 to smart-deposit module 114. The method may continue to step 304.

Smart-deposit module 114 may identify the planned deposit based on deposit identifier 128 and information stored in memory 120 at step 304. For example, information stored in memory 120 may indicate that deposit identifier 128 is associated with the planned deposit so that smart-deposit module 114 may access the information stored in memory 120 to identify the planned deposit. The method may continue at step 306.

Smart-deposit module 114 may determine whether planned deposit has been delivered to depository 134 at step 306. For example, in response to identifying planned deposit based on deposit identifier 128, smart-deposit module 114 may prompt the release of an opening of depository 134. Depository 134 may include a sensor so that, when a user puts deposit bag 126 in depository 134, the sensor detects that deposit bag 126 has been delivered. Deposit location 130 may communicate to smart-deposit module 114 to indicate that deposit bag 126 has been placed in depository 134. If deposit bag 126 has been delivered to depository 134, the method may continue at step 308. Alternatively, if, after a certain amount of time, smart-deposit module 114 does not receive any indication that deposit bag 126 has been delivered to depository 134, the method may end.

Smart-deposit module 114 may access business rules 124 associated with the account associated with the planned deposit at step 308. For example, business rules 124 may be stored in memory 120 and may indicate that smart deposits made to the account should immediately be posted to the account after deposit bag 126 is delivered to depository 134. Alternatively, business rules 124 may indicate that the funds should be posted to the account after a specified period of time or after verification of the planned deposit. The method may continue at step 310.

Smart-deposit module 114 may determine whether the funds should be immediately available at step 310. If, based on the account and business rules 124, the funds should be immediately available, the method will continue at step 318. If alternatively, smart-deposit module 114 determines that the funds should not be immediately available, the method may continue at step 312.

Smart-deposit module 114 may determine whether the funds should be available after a specified period of time at step 312. If based on the account and business rules 124, the funds should be available after a specified period of time, the method will continue at step 314. If alternatively, smart-deposit module 114 determines that the funds should not be made available after a specified period of time, the method may continue at step 316.

Smart-deposit module 114 may wait a specified duration of time at step 314. For example, business rules 124 may indicate that funds associated with a smart deposit for the associated account should be available after two days. Smart-deposit module 114 may wait two days and may continue at step 318.

Smart-deposit module 114 may determine whether planned deposit has been verified at step 316. For example, smart-deposit module 114 may receive information indicating that funds in deposit bag 126 have been verified. For example, the funds may be verified by an employee associated with entity 104 who may input information indicating the amount of funds in deposit bag 126. If smart-deposit module 114 receives verification of the planned deposit, the method may continue at step 318. If smart-deposit module 114 does not receive verification of the planned deposit, the method may end.

Smart-deposit module 114 may post funds to the account at step 318. For example, smart-deposit module 114 may credit the account with the funds associated with the planned deposit so that the funds are available to customer 106a in the account. The method may end.

Modifications, additions, or omissions may be made to method 300 disclosed herein without departing from the scope of the disclosure. The methods may include more, fewer, or other steps. For example, smart-deposit module 114 may initiate release of an opening of depository 134 in response to identifying a planned deposit based on deposit identifier 128 and information stored in memory 120. As an additional example, smart-deposit module 114 may update a manifest with information to indicate that a particular deposit has been made and/or provide the manifest or portions of the manifest to a transit operator to allow the transit operator to reconcile the manifest with the deposits that the transit operator picks up at deposit location 130. Additionally, steps may be performed in parallel or in any suitable order. For example, smart-deposit module 114 may access business rules 124 associated with the account associated with the planned deposit before determining whether the planned deposit has been delivered to depository 134.

According to certain embodiments of the present disclosure, disadvantages and problems associated with previous systems for facilitating deposits may be reduced or eliminated.

Certain embodiments of the disclosure may provide one or more technical advantages. For example, identifying, based on deposit identifier 128 and information stored in memory 120, a planned deposit may allow for identification of planned-deposit information without immediate verification, post verification, or package forwarding. This may limit needed processing and storage resources for performing these steps and for performing investigations that are needed when deposits go missing during these processes.

Certain embodiments of the disclosure may provide one or more economic advantages. In an embodiment, receiving planned-deposit information 112 from entity 104 that is remote from deposit location 130 may allow a manager associated with customer 106a, for example, to input information about a planned deposit and have verification that the information was received before sending another employee, for example, to make the planned deposit. This makes the process more convenient, efficient, and secure. Associating deposit identifier 128 with the planned deposit and storing planned-deposit information 112 and deposit identifier 128 in memory 120 may allow system 100 to recognize a planned deposit when deposited by the employee without the employee needing any other information about the deposit, which also improves convenience, efficiency, and security. Identifying, based on deposit identifier 128 and information stored in memory 120, a planned deposit, detecting that the planned deposit has been delivered to depository 134, and determining, by processor 118 and based on one or more business rules 124, an availability of funds associated with the planned deposit may allow for identification of planned-deposit information without immediate verification, post verification, and package forwarding. This may reduce expenses associated with performing these steps, including labor costs for performing these steps, as well as investigation and/or theft costs associated with deposits that go missing during these processes.

Certain embodiments of the present disclosure may include some, all, or none of the above advantages. One or more other economic, technical, or other advantages may be readily apparent to those skilled in the art from the figures, descriptions, and claims included herein.

Although the present disclosure has been described with several embodiments, diverse changes, substitutions, variations, alterations, and modifications may be suggested to one skilled in the art, and it is intended that the disclosure encompass all such changes, substitutions, variations, alterations, transformations, and modifications as fall within the spirit and scope of the appended claims.

What is claimed is:

1. A system comprising:
one or more processors, the one or more processors operable to:
receive a deposit identifier for a deposit bag, the deposit identifier associated with planned-deposit information and printed at a terminal located remotely from a deposit location, the deposit identifier received from a scanner that scans the deposit bag at the deposit location;
send a command to release an opening of a depository located at the deposit location, the command sent in response to receiving the deposit identifier from the scanner;
determine that the depository has received the deposit bag;

update a manifest to indicate that the deposit bag was received;
post the planned-deposit immediately in response to determining, based on deposit-location information and the deposit identifier, that the planned-deposit has been authorized for immediate posting;
determine that the depository has received a second deposit bag associated with a second deposit identifier for a second planned-deposit;
post the second planned-deposit after a specified period of time in response to determining, based on second deposit-location information and the second deposit identifier, that the second planned-deposit has not been authorized for immediate posting and that the second planned-deposit has been authorized for posting after the specified period of time;
determine that the depository has received a third deposit bag associated with a third deposit identifier for a third planned-deposit; and
post the third planned-deposit after receiving a verification in response to determining, based on third deposit-location information and the third deposit identifier, that the third planned-deposit has not been authorized for immediate posting and has not been authorized for posting after the specified period of time.

2. The system of claim 1, further comprising:
the one or more processors operable to:
communicate at least a portion of the manifest to a transit operator; and
reconcile the manifest based on the deposit bags that the transit operator picks up from the depository.

3. The system of claim 2, wherein the one or more processors communicates only the portion of the manifest comprising entries for deposits made since the last pickup from the depository.

4. The system of claim 2, wherein the manifest is communicated to the transit operator via an interface at the deposit location or the manifest is communicated to the transit operator via an e-mail to a device accessible to the transit operator.

5. The system of claim 1, wherein the manifest includes an entry for each of a plurality of deposit bags deposited in the depository, and each entry includes a date of deposit, a time of deposit, and the deposit identifier of the respective deposit bag.

6. The system of claim 1, wherein the deposit identifier is one of the following:
a barcode;
a QR code; and
a 3D identifier operable to be recognized by a 3D scanner.

7. Non-transitory computer readable medium comprising logic, the logic, when executed by one or more processors, operable to:
receive a deposit identifier for a deposit bag, the deposit identifier associated with planned-deposit information and printed at a terminal located remotely from a deposit location, the deposit identifier received from a scanner that scans the deposit bag at the deposit location;
send a command to release an opening of a depository located at the deposit location, the command sent in response to receiving the deposit identifier from the scanner;
determine that the depository has received the deposit bag;
update a manifest to indicate that the deposit bag was received;
post the planned-deposit immediately in response to determining, based on deposit-location information and the deposit identifier, that the planned-deposit has been authorized for immediate posting;
determine that the depository has received a second deposit bag associated with a second deposit identifier for a second planned-deposit;
post the second planned-deposit after a specified period of time in response to determining, based on second deposit-location information and the second deposit identifier, that the second planned-deposit has not been authorized for immediate posting and that the second planned-deposit has been authorized for posting after the specified period of time;
determine that the depository has received a third deposit bag associated with a third deposit identifier for a third planned-deposit; and
post the third planned-deposit after receiving a verification in response to determining, based on third deposit-location information and the third deposit identifier, that the third planned-deposit has not been authorized for immediate posting and has not been authorized for posting after the specified period of time.

8. The medium of claim 7, the logic further operable to:
communicate at least a portion of the manifest to a transit operator; and
reconcile the manifest based on the deposit bags that the transit operator picks up from the depository.

9. The medium of claim 8, wherein the logic communicates only the portion of the manifest comprising entries for deposits made since the last pickup from the depository.

10. The medium of claim 8, wherein the manifest is communicated to the transit operator via an interface at the deposit location or the manifest is communicated to the transit operator via an e-mail to a device accessible to the transit operator.

11. The medium of claim 7, wherein the manifest includes an entry for each of a plurality of deposit bags deposited in the depository, and each entry includes a date of deposit, a time of deposit, and the deposit identifier of the respective deposit bag.

12. The medium of claim 7, wherein the deposit identifier is one of the following:
a barcode;
a QR code; and
a 3D identifier operable to be recognized by a 3D scanner.

13. A method comprising:
receiving, by one or more processors, a deposit identifier for a deposit bag, the deposit identifier associated with planned-deposit information and printed at a terminal located remotely from a deposit location, the deposit identifier received from a scanner that scans the deposit bag at the deposit location;
sending, by the one or more processors, a command to release an opening of a depository located at the deposit location, the command sent in response to receiving the deposit identifier from the scanner;
determining, by the one or more processors, that the depository has received the deposit bag;
updating, by the one or more processors, a manifest to indicate that the deposit bag was received;
posting the planned-deposit immediately in response to determining, based on deposit-location information and the deposit identifier, that the planned-deposit has been authorized for immediate posting;
determining that the depository has received a second deposit bag associated with a second deposit identifier for a second planned-deposit;
posting the second planned-deposit after a specified period of time in response to determining, based on second deposit-location information and the second deposit identifier, that the second planned-deposit has not been authorized for immediate posting and that the second planned-deposit has been authorized for posting after the specified period of time;

determining that the depository has received a third deposit bag associated with a third deposit identifier for a third planned-deposit; and posting the third planned-deposit after receiving a verification in response to determining, based on third deposit-location information and the third deposit identifier, that the third planned-deposit has not been authorized for immediate posting and has not been authorized for posting after the specified period of time.

14. The method of claim 13, further comprising:

communicating at least a portion of the manifest to a transit operator; and reconciling the manifest based on the deposit bags that the transit operator picks up from the depository.

15. The method of claim 14, wherein the method communicates only the portion of the manifest comprising entries for deposits made since the last pickup from the depository.

16. The method of claim 14, wherein the manifest is communicated to the transit operator via an interface at the deposit location or the manifest is communicated to the transit operator via an e-mail to a device accessible to the transit operator.

17. The method of claim 13, wherein the manifest includes an entry for each of a plurality of deposit bags deposited in the depository, and each entry includes a date of deposit, a time of deposit, and the deposit identifier of the respective deposit bag.

* * * * *